United States Patent
Seidel et al.

(10) Patent No.: US 7,223,812 B2
(45) Date of Patent: *May 29, 2007

(54) IMPACT-MODIFIED POLYMER COMPOSITION

(75) Inventors: Andreas Seidel, Dormagen (DE); Marc Vathauer, Köln (DE); Thomas Eckel, Dormagen (DE); Holger Warth, Dormagen (DE); Dieter Wittmann, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 97 days.

This patent is subject to a terminal disclaimer.

(21) Appl. No.: 10/164,128

(22) Filed: Jun. 5, 2002

(65) Prior Publication Data

US 2003/0008964 A1    Jan. 9, 2003

(30) Foreign Application Priority Data

Jun. 11, 2001    (DE) ................................ 101 28 174

(51) Int. Cl.
  *C08K 3/34* (2006.01)
  *C08K 5/52* (2006.01)
  *C08K 5/53* (2006.01)

(52) U.S. Cl. ...................... 524/451; 524/139; 524/140; 524/504

(58) Field of Classification Search ................ 524/451, 524/580, 457, 461, 504; 523/200, 201, 202, 523/205, 206
See application file for complete search history.

(56) References Cited

U.S. PATENT DOCUMENTS

| 5,030,675 | A | * | 7/1991 | Wittmann et al. | 524/130 |
| 5,091,461 | A | | 2/1992 | Skochdopole | 524/493 |
| 5,162,410 | A | | 11/1992 | Sweet | 524/266 |
| 5,162,419 | A | * | 11/1992 | Pottier-Metz et al. | 524/451 |
| 5,207,961 | A | * | 5/1993 | Wank et al. | 264/135 |
| 5,637,643 | A | * | 6/1997 | Umeda et al. | 524/537 |
| 6,174,943 | B1 | * | 1/2001 | Matsumoto et al. | 524/115 |
| 6,174,945 | B1 | * | 1/2001 | Kim et al. | 524/127 |
| 6,417,256 | B1 | * | 7/2002 | Eckel et al. | 524/127 |
| 6,465,555 | B1 | * | 10/2002 | Nodera et al. | 524/414 |
| 6,495,228 | B1 | * | 12/2002 | Mauch et al. | 428/40.1 |
| 6,686,404 | B1 | * | 2/2004 | Eckel et al. | 524/127 |
| 6,737,465 | B2 | * | 5/2004 | Seidel et al. | 524/451 |

FOREIGN PATENT DOCUMENTS

| EP | 0 709 432 A2 | | 5/1996 |
| EP | 0 758 003 | | 2/1997 |
| JP | 11-199768 | | 7/1999 |
| WO | 98/51737 | | 11/1998 |
| WO | WO 00/42106 | * | 7/2004 |

* cited by examiner

*Primary Examiner*—Tae H Yoon
(74) *Attorney, Agent, or Firm*—Womble, Carlye, Sandridge & Rice, PLLC

(57) ABSTRACT

A thermoplastic molding composition containing talc is disclosed. The composition wherein talc has a median particle size of less than 1000 nm further contains a polycarbonate and/or polyester-carbonate, and a graft polymer having as graft base a rubber having a glass transition temperature of below about 10° C. is suitable for preparing molded articles having improved mechanical properties, such as weld line strength, elongation at break and toughness at low temperatures.

16 Claims, No Drawings

IMPACT-MODIFIED POLYMER COMPOSITION

FIELD OF THE INVENTION

The invention relates to a thermoplastic, impact-modified, polymeric, molding composition and more particularly to a composition containing talc.

SUMMARY OF THE INVENTION

A thermoplastic molding composition containing talc is disclosed. The composition wherein talc has a median particle size of less than 1000 nm further contains a polycarbonate and/or polyester-carbonate, and a graft polymer having as graft base a rubber having a glass transition temperature of below about 10° C. is suitable for preparing molded articles having improved mechanical properties, such as weld line strength, elongation at break and toughness at low temperatures.

BACKGROUND OF THE INVENTION

It is known to add talc as a reinforcing substance to polycarbonate compositions in order to increase the rigidity and tensile strength, to increase the dimensional stability during variations in temperature and to improve the surface properties. The talc added also serves as a flameproofing synergist in flame-resistant materials.

WO 98/51737 A1 discloses PC/SAN blends which have polystyrene-grafted polybutadiene rubber as an impact modifier and comprise mineral fillers, e.g. talc, with an average particle size of preferably 1.5 to 5 µm. The molding compositions described are not given a flame-resistant treatment. It furthermore emerges from the examples that molding compositions which comprise talc with a particle size of <1.5 mm have a low melt volume index (MVI). The PC/SAN blends described with polystyrene-grafted polybutadiene rubber show deficits in the mechanical properties.

U.S. Pat. No. 5,162,410 describes PC/ABS molding compositions which comprise talc with an average particle size of 1.5 to 20 µm, preferably 4.0 to 10 µm, to improve the surface appearance of injection-molded finished components. The molding compositions described are distinguished by a matt surface and improved mechanical properties.

JP-A 11/199768 discloses flame-resistant PC/ABS compositions comprising talc and phosphoric acid esters, 90 wt. % of the talc having a particle size of <4 µm. The PC/ABS compositions described have improved burning properties and are suitable in particular for thin wall applications. Molding compositions with talc types with average particle diameters in the sub-micro range are not described, nor are there indications that an improvement in the mechanical properties, in particular the elongation at break and bonding strength can be improved by using such types.

U.S. Pat. No. 5,091,461 discloses PC/ABS compositions which comprise as the reinforcing substance talc and non-calcined clay minerals. The talc types used have a particle size of less than 44 µm (=44,000 nm). The PC/ABS compositions are distinguished by a reduced linear thermal expansion coefficient and a relatively high impact strength at low temperatures.

EP-A 0 758 003 A2 describes PC molding compositions which can comprise inorganic fillers with a particle diameter of >0.5 mm as the reinforcing substance. Talc with a particle diameter of ≧0.2 mm is mentioned, inter alia, as a filler. The PC molding compositions can furthermore be given a flame-resistant treatment and are distinguished by an improved surface appearance and a high modulus of elasticity. Polycarbonate blends are not described in this specification.

A disadvantage of the talc-containing PC/ABS blends known from the prior art is that an increase in the E modulus is indeed achieved by the addition of talc, but at the same time other mechanical properties, such as elongation at break and toughness, are impaired. The addition of talc to PC/ABS blends as a rule leads to a significant deterioration in the toughness of the shaped article produced from the composition. Either the toughness achieved by addition of talc is often therefore not sufficient for specific uses, or the amount of the inorganic material employed is too low to realize the property advantages intended from its addition to a sufficient extent.

In addition, the weld line strength in known talc-containing PC/ABS blends is often inadequate.

It is thus desirable to provide polycarbonate compositions to which talc is added in a known manner for the purpose of improving at least one material property, but which are distinguished by an improved level of toughness and/or toughness at low temperatures compared with the prior art and an increased weld line strength. In particular, the polycarbonate compositions should be distinguished by an improved toughness at low temperatures with simultaneously good values for the elongation at break and E modulus.

The polycarbonate composition according to the invention should exhibit a good processing behavior, i.e. high melt flow rate.

DETAILED DESCRIPTION OF THE INVENTION

This object is achieved by a polycarbonate composition which comprises (A) at least one aromatic polycarbonate and/or polyester-carbonate, (B) at least one graft polymer of 5 to 95 wt. % of a mixture of 50 to 99 parts by wt. of vinylaromatics and/or vinylaromatics substituted on the nucleus and/or methacrylic acid ($C_1$–$C_8$)-alkyl esters and 1 to 50 parts by wt. of vinyl cyanides and/or (meth)acrylic acid ($C_1$–$C_8$)-alkyl esters and/or derivatives of unsaturated carboxylic acids, on 95 to 5 wt. % of at least one graft base with a glass transition temperature of below about 10° C. and (C) at least one talc with a median particle diameter of less than 1,000 nm.

The invention furthermore provides shaped articles consisting of these compositions or comprising them.

Surprisingly, it has been found that by addition of specific talc types with a median particle diameter of less than about 1,000 nm to PC/ABS blends, a significant improvement in weld line strength, elongation at break and toughness compared with comparable molding compositions with conventional talc types may be achieved, while retaining the E modulus and melt flow.

The polycarbonate or polyester-carbonate compositions according to the invention may comprise further polymeric constituents and conventional additives, in addition to the graft polymers described. Further possible polymeric constituents are, for example, graft polymers of a vinyl monomer on one or more graft bases, thermoplastic vinyl (co) polymers, polyalkylene terephthalates, polyamides and further thermoplastic resins. Optional additives include mold release agents, stabilizers, antioxidants, flameproofing agents, dyestuffs and pigments, antistatics, nucleating agents, anti-dripping agents and organic and further inorganic fillers and reinforcing substances.

The polycarbonates/polyester-carbonates contained in the compositions according to the invention and further possible constituents are explained subsequently by way of example.

Component A

Aromatic polycarbonates and/or aromatic polyester-carbonates according to component A which are suitable according to the invention are known from the literature or may be prepared by processes known from the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610 and DE-A 3 382 396; for the preparation of aromatic polyester-carbonates see e.g. DE-A 3 077 934).

The preparation of aromatic polycarbonates is carried out e.g. by reaction of diphenols with carbonic acid halides, preferably phosgene, and/or with aromatic dicarboxylic acid dihalides, preferably benzenedicarboxylic acid dihalides, by the phase interface process, optionally using chain terminators, for example monophenols, and optionally using branching agents which are trifunctional or more than trifunctional, for example triphenols or tetraphenols.

Diphenols for the preparation of the aromatic polycarbonates and/or aromatic polyester-carbonates are preferably those of the formula (I)

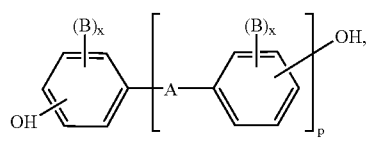

wherein

A is a single bond, $C_1$ to $C_5$-alkylene, $C_2$ to $C_5$-alkylidene, $C_5$ to $C_6$-cycloalkylidene, —O—, —SO—, —CO—, —S—, —SO$_2$—, $C_6$ to $C_{12}$-arylene, on to which further aromatic rings optionally containing heteroatoms may be fused, or a radical of the formula (II) or (III)

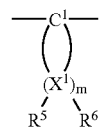

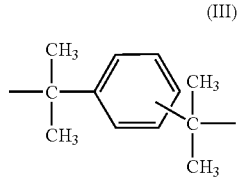

B in each case is $C_1$ to $C_{12}$-alkyl, preferably methyl, or halogen, preferably chlorine and/or bromine, x in each case independently of one another, is 0, 1 or 2, p is 1 or 0 and $R^5$ and $R^6$ may be chosen individually for each $X^1$ and independently of one another denote hydrogen or $C_1$ to $C_6$-alkyl, preferably hydrogen, methyl or ethyl, $X^1$ denotes carbon and m denotes an integer from 4 to 7, preferably 4 or 5, with the proviso that on at least one atom $X^1$ $R^5$ and $R^6$ are simultaneously alkyl.

Preferred diphenols are hydroquinone, resorcinol, dihydroxydiphenols, bis-(hydroxyphenyl)—$C_1$–$C_5$-alkanes, bis-(hydroxyphenyl)—$C_5$–$C_6$-cycloalkanes, bis-(hydroxyphenyl) ethers, bis-(hydroxyphenyl) sulfoxides, bis-(hydroxyphenyl) ketones, bis-(hydroxyphenyl) sulfones and α,α-bis-(hydroxyphenyl)-diisopropyl-benzenes, and derivatives thereof brominated on the nucleus and/or chlorinated on the nucleus.

Particularly preferred diphenols are 4,4'-dihydroxydiphenyl, bisphenol A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and di- and tetrabrominated or -chlorinated derivatives thereof, such as, for example, 2,2-bis(3-chloro-4-hydroxyphenyl)-propane, 2,2-bis-(3,5-dichloro-4-hydroxyphenyl)-propane or 2,2-bis-(3,5-dibromo-4-hydroxyphenyl)propane. 2,2-Bis-(4-hydroxyphenyl)propane (bisphenol A) is particularly preferred.

The diphenols may be employed individually or as any desired mixtures. The diphenols are known from the literature or are obtainable by processes known from the literature.

Chain terminators which are suitable for the preparation of the thermoplastic aromatic polycarbonates are, for example, phenol, p-chlorophenol, p-tert-butylphenol or 2,4,6-tribromophenol, and also long-chain alkylphenols, such as 4-(1,3-tetramethylbutyl)-phenol according to DE-A 2 842 005, or monoalkylphenols or dialkylphenols having a total of 8 to 20 C atoms in the alkyl substituents, such as 3,5-di-tert-butyl-phenol, p-iso-octylphenol, p-tert-octylphenol, p-dodecylphenol and 2-(3,5-dimethylheptyl) -phenol and 4-(3,5-dimethylheptyl)-phenol. The amount of chain terminators to be employed is in general between 0.5 mol % and 10 mol %, based on the molar sum of the particular diphenols employed.

The thermoplastic, aromatic polycarbonates have weight-average molecular weights ($M_w$, measured e.g. by ultracentrifuge or scattered light measurement) of 10,000 to 200,000, preferably 15,000 to 80,000.

The thermoplastic, aromatic polycarbonates may be branched in a known manner, and in particular preferably by the incorporation of 0.05 to 2.0 mol %, based on the sum of the diphenols employed, of compounds which are trifunctional or more than trifunctional, for example those having three or more phenolic groups.

Both homopolycarbonates and copolycarbonates are suitable. For the preparation of copolycarbonates according to the invention according to component A, 1 to 25 wt. %, preferably 2.5 to 25 wt. % (based on the total amount of diphenols to be employed) of polydiorganosiloxanes with hydroxyaryloxy end groups may also be employed. These are known (for example U.S. Pat. No. 3,419,634) or may be prepared by processes known from the literature. The preparation of copolycarbonates containing polydiorganosiloxanes is described e.g. in DE-A 3 334 782.

Preferred polycarbonates are, in addition to bisphenol A homopolycarbonates, the copolycarbonates of bisphenol A with up to 15 mol %, based on the molar sum of diphenols, of other diphenols mentioned as preferred or particularly preferred, in particular 2,2-bis(3,5-dibromo-4-hydroxyphenyl)-propane.

Aromatic dicarboxylic acid dihalides for the preparation of aromatic polyester-carbonates are preferably the di-acid dichlorides of isophthalic acid, terephthalic acid, diphenyl ether-4,4'-dicarboxylic acid and naphthalene-2,6-dicarboxylic acid.

Mixtures of the di-acid dichlorides of isophthalic acid and terephthalic acid in a ratio of between 1:20 and 20:1 are particularly preferred.

A carbonic acid halide, preferably phosgene, is additionally co-used as a bifunctional acid derivative in the preparation of polyester-carbonates.

Possible chain terminators for the preparation of the aromatic polyester-carbonates are, in addition to the monophenols already mentioned, also chlorocarbonic acid esters thereof and the acid chlorides of aromatic monocarboxylic acids, which may optionally be substituted by $C_1$ to $C_{22}$-alkyl groups or by halogen atoms, as well as aliphatic $C_2$–$C_{22}$-monocarboxylic acid chlorides.

The amount of chain terminators is in each case 0.1 to 10 mol %, based on the moles of diphenols in the case of the phenolic chain terminators and on the moles of dicarboxylic acid dichlorides in the case of monocarboxylic acid chloride chain terminators.

The aromatic polyester-carbonates may also contain incorporated aromatic hydroxycarboxylic acids.

The aromatic polyester-carbonates may be both linear and branched in a known manner (in this context see also DE-A 2 940 042 and DE-A 3 007 934.

Branching agents which may be used are, for example, carboxylic acid chlorides which are trifunctional or more than trifunctional, such as trimesic acid trichloride, cyanuric acid trichloride, 3,3',4,4'-bnezophenone-tetracarboxylic acid tetrachloride, 1,4,5,8-napthalenetetracarboxylic acid tetrachloride or pyromellitic acid tetrachloride, in amounts of 0.01 to 1.0 mol % (based on the dicarboxylic acid dichlorides employed), or phenols which are trifunctional or more than trifunctional, such as phloroglucinol, 4,6-dimethyl-2,4, 6-tri-(4-hydroxyphenyl)-2-heptene, 4,4-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxy-phenyl-isopropyl)-phenol, tetra-(4-hydroxyphenyl)-methane, 2,6-bis(2-hydroxy-5-methyl-benzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane or 1,4-bis[4,4'-dihydroxytri-phenyl)-methyl]-benzene, in amounts of 0.01 to 1.0 mol %, based on the diphenols employed. Phenolic branching agents may be initially introduced with the diphenols, and acid chloride branching agents may be introduced together with the acid dichlorides.

The content of carbonate structural units may vary as desired in the thermoplastic, aromatic polycarbonates. The content of carbonate groups is preferably up to 100 mol %, in particular up to 80 mol %, particularly preferably up to 50 mol %, based on the sum of ester groups and carbonate groups. Both the ester and the carbonate content of the aromatic polyester-carbonates may be present in the polycondensate in the form of blocks or in random distribution.

The relative solution viscosity ($\eta_{rel}$) of the aromatic polycarbonates and polyester-carbonates is in the range from 1.18 to 1.4, preferably 1.20 to 1.32 (measured on solutions of 0.5 g polycarbonate or polyester-carbonate in 100 ml methylene chloride solution at 25° C.).

The thermoplastic, aromatic polycarbonates and polyester-carbonates may be employed by themselves or in any desired mixture. They may be contained in the composition according to the invention in an amount of preferably 20 to 90 wt. %, in particular 30 to 85 wt. %, more preferably 40 to 80 wt. %, and very particularly preferably 50 to 75 wt. %.

Component B

Component B comprises one or more graft polymers of

B.1 5 to 95 wt. %, preferably 30 to 90 wt. %, of a mixture of

B.1.1 50 to 99 parts by wt., in particular 50 to 90, more preferably 55 to 85, very particularly preferably 60 to 80 parts by wt. of vinylaromatics and/or vinylaromatics which are substituted on the nucleus (such as, for example, styrene, α-methylstyrene, p-methylstyrene or p-chlorostyrene) and/or methacrylic acid ($C_1$–$C_8$)-alkyl esters (such as methyl methacrylate or ethyl methacrylate) and B.1.2 1 to 50 parts by wt., in particular 10 to 50, more preferably 15 to 45, very particularly preferably 20 to 40 parts by wt. of vinyl cyanides (unsaturated nitriles, such as acrylonitrile and methacrylonitrile) and/or (meth) acrylic acid ($C_1$–$C_8$)-alkyl esters (such as methyl methacrylate, n-butyl acrylate or t-butyl acrylate) and/or derivatives (such as anhydrides and imides) of unsaturated carboxylic acids (for example maleic anhydride and N-phenyl-maleimide) on B.2 95 to 5, preferably 70 to 10 wt. % of one or more graft bases with glass transition temperatures of <10° C., preferably <0° C., particularly preferably <−20° C.

The graft base B.2 in general has a median particle size ($d_{50}$ value) of 0.05 to 10 μm, preferably 0.1 to 5 μm, particularly preferably 0.2 to 1 μm.

Preferred monomers B.1.1 are chosen from at least one of the monomers styrene, α-methylstyrene and methyl methacrylate, and preferred monomers B.1.2 are chosen from at least one of the monomers acrylonitrile, maleic anhydride and methyl methacrylate.

Particularly preferred monomers are B.1.1 styrene and B.1.2 acrylonitrile.

Graft bases B.2 which are suitable for the graft polymers B are, for example, diene rubbers, EP(D)M rubbers, that is to say those based on ethylene/propylene and optionally diene, and acrylate, polyurethane, silicone, chloroprene and ethylene/vinyl acetate rubbers.

Preferred graft bases B.2 are diene rubbers (e.g. based on butadiene, isoprene etc.) or mixtures of diene rubbers or copolymers of diene rubbers or mixtures thereof with further copolymerizable monomers (e.g. according to B.1.1 and B.1.2), with the proviso that the glass transition temperature of component B.2 is below <10° C., preferably <0° C., particularly preferably <−10° C.

Pure polybutadiene rubber is particularly preferred.

Particularly preferred polymers B are e.g. ABS polymers (emulsion, bulk and suspension ABS), such as are described e.g. in DE-A 2 035 390 (=U.S. Pat. No. 3,644,574) or in DE-A 2 248 242 (=GB-PS 1 409 275) or in Ullmanns, Enzyklopadie der Technischen Chemie [Ullmann's Encyclopaedia of Industrial Chemistry], vol.19 (1980), p.280 et seq. The gel content of the graft base B.2 is at least 30 wt. %, preferably at least 40 wt. % (measured in toluene).

The graft copolymers B are prepared by free-radical polymerization, e.g. by emulsion, suspension, solution or bulk polymerization, preferably by emulsion or bulk polymerization.

ABS polymers which are prepared by redox initiation with an initiator system of organic hydroperoxide and ascorbic acid in accordance with U.S. Pat. No. 4,937,285 are also particularly suitable graft rubbers.

Since as is known the graft monomers are not necessarily grafted completely on the graft base during the grafting reaction, according to the invention graft polymers B are also to be understood as those products which are produced by (co)polymerization of the graft monomers in the presence of the graft base and are co-obtained during the working up.

Suitable acrylate rubbers according to B.2 of polymers B are, preferably, polymers of acrylic acid esters, and optionally also copolymers with up to 40 wt. %, based on B.2, of other polymerizable, ethylenically unsaturated monomers. Preferred polymerizable acrylic acid esters include $C_1$–$C_8$-alkyl esters, for example the methyl, ethyl, butyl, n-octyl and 2-ethylhexyl esters; halogenoalkyl esters, preferably halogeno-$C_1$–$C_8$-alkyl esters, such as chloroethyl acrylate, and mixtures of these monomers.

Monomers with more than one polymerizable double bond may be copolymerized for crosslinking. Preferred examples of crosslinking monomers are esters of unsaturated monocarboxylic acids having 3 to 8 C atoms and unsaturated monohydric alcohols having 3 to 12 C atoms, or saturated polyols having 2 to 4 OH groups and 2 to 20 C atoms, such as ethylene glycol dimethacrylate and allyl methacrylate; polyunsaturated heterocyclic compounds, such as trivinyl and triallyl cyanurate; polyfunctional vinyl compounds, such as di- and trivinylbenzenes; and also triallyl phosphate and diallyl phthalate.

Preferred crosslinking monomers are allyl methacrylate, ethylene glycol dimethacrylate, diallyl phthalate and heterocyclic compounds which contain at least three ethylenically unsaturated groups.

Particularly preferred crosslinking monomers are the cyclic monomers triallyl cyanurate, triallyl isocyanurate, triacryloylhexahydro-s-triazine and triallylbenzenes. The amount of crosslinking monomers is preferably 0.02 to 5, in particular 0.05 to 2 wt. %, based on the graft base B.2.

In the case of cyclic crosslinking monomers with at least three ethylenically unsaturated groups, it is advantageous to limit the amount to less than 1 wt. % of the graft base B.2.

Preferred "other" polymerizable, ethylenically unsaturated monomers which, in addition to the acrylic acid esters, may optionally be used for the preparation of the graft base B.2 are e.g. acrylonitrile, styrene, α-methylstyrene, acrylamides, vinyl $C_1$–$C_6$-alkyl ethers, methyl methacrylate and butadiene. Preferred acrylate rubbers as the graft base B.2 are emulsion polymers which have a gel content of at least 60 wt. %.

Further suitable graft bases according to B.2 are silicone rubbers with grafting-active sites, such as are described in DE-A 3 704 657, DE-A 3 704 655, DE-A 3 631 540 and DE-A 3 631 539.

The gel content of the graft base B.2 is determined at 25° C. in a suitable solvent (M. Hoffmann, H. Krömer, R. Kuhn, Polymeranalytik I and II [Polymer Analysis I and II], Georg Thieme-Verlag, Stuttgart 1977).

The median particle size $d_{50}$ is the diameter above and below which in each case 50 wt. % of the particles lie. It may be determined by means of ultracentrifuge measurement (W. Scholtan, H. Lange, Kolloid, Z. and Z. Polymer 250 (1972), 782–1796).

Component B may be contained in the composition according to the invention in an amount of preferably 1 to 50 wt. %, particularly preferably 2 to 30 wt. %, and in the most preferred manner 4 to 20 wt. %, based on the composition.

If flameproofing agents are simultaneously employed in the composition, the composition may comprise component B in an amount of preferably 1 to 30 wt. %, particularly preferably 1 to 20 wt. %, more preferably 2 to 15 wt. % and in the most preferred manner 3 to 10 wt. %, based on the composition.

Component C

The polymer compositions comprise talc with a median particle diameter of less than 1,000 nm, preferably less than 800 nm, particularly preferably less than 600 nm.

"Median particle diameter" in the context of the invention is understood as meaning the $d_{50}$ value determined by means of sedimentation (Sedigraph 5100).

Talc is understood as meaning a naturally occurring or synthetically prepared talc. Pure talc has the chemical composition $3MgO.4SiO_2.H_2O$ and thus an MgO content of 31.9 wt. %, an $SiO_2$ content of 63.4 wt. % and a content of chemically bonded water of 4.8 wt. %. It is a silicate with a laminar structure.

Naturally occurring talc materials in general do not have the above mentioned ideal composition, since they are contaminated by partial replacement of the magnesium by other elements, by partial replacement of silicon, for example by aluminium, and/or by intergrowth with other minerals, such as dolomite, magnesite and chlorite. These contaminated naturally occurring talc powders may also be employed in the composition according to the invention, but talc types of high purity are preferred. These comprise, for example, an MgO content of 28 to 35 wt. %, preferably 30 to 33 wt. %, particularly preferably 30.5 to 32 wt. %, and an $SiO_2$ content of 55 to 65 wt. %, preferably 58 to 64 wt. %, particularly preferably 60 to 62.5 wt. %. Preferred talc types are furthermore distinguished by an $Al_2O_3$ content of <5 wt. %, particularly preferably <1 wt. %, in particular <0.7 wt. %, and an $Fe_2O_3$ content of <2 wt. %, in particular $\leq 1$ wt. %, particularly preferably $\leq 0.8$ wt. %, very particularly preferably <0.6 wt. %.

The talc contained in the composition according to the invention may be surface-treated, for example silanized, in order to ensure a better compatibility with the polymer.

The talc may be employed in compacted form in order to improve the metering properties (flow properties).

The talc may be contained in the composition according to the invention in an amount of preferably 0.1 to 30 wt. %, in particular 0.5 to 15 wt. %, particularly preferably 1 to 15 wt. % and very particularly preferably 5 to 12 wt. %, based on the weight of the composition.

Component D

Component D comprises one or more thermoplastic vinyl (co)polymers D.1 and/or polyalkylene terephthalates D.2.

Polymers of at least one monomer from the group consisting of vinylaromatics, vinyl cyanides (unsaturated nitrites), (meth)acrylic acid ($C_1$ to $C_8$)-alkyl esters, unsaturated carboxylic acids and derivatives (such as anhydrides and imides) of unsaturated carboxylic acids, are suitable as the vinyl (co)polymers D.1. (Co)polymers which are particularly suitable are those of D.1.1 50 to 99, preferably 60 to 80 parts by wt. of vinylaromatics and/or vinylaromatics substituted on the nucleus (such as, for example, styrene, α-methylstyrene, p-methylstyrene and p-chlorostyrene) and/or methacrylic acid ($C_1$ to $C_8$)-alkyl esters (such as methyl methacrylate and ethyl methacrylate) and D.1.2 1 to 50, preferably 20 to 40 parts by wt. of vinyl cyanides (unsaturated nitrites), such as acrylonitrile and methacrylonitrile, and/or (meth)acrylic acid ($C_1$–$C_8$)- alkyl esters (such as methyl methacrylate, n-butyl acrylate and t-butyl acrylate) and/or unsaturated carboxylic acids (such as maleic acid) and/or derivatives (such as anhydrides and imides) of unsaturated carboxylic acids (for example maleic anhydride and N-phenyl-maleimide).

The (co)polymers D.1 are resinous, thermoplastic and rubber-free.

The copolymer of D.1.1 styrene and D.1.2 acrylonitrile is particularly preferred.

The (co)polymers according to D.1 are known and may be prepared by free-radical polymerization, in particular by emulsion, suspension, solution or bulk polymerization. The (co)polymers preferably have average molecular weights $M_w$ (weight-average, determined by light scattering or sedimentation) of between 15,000 and 200,000.

The polyalkylene terephthalates of component D.2 are reaction products of aromatic dicarboxylic acids or their reactive derivatives, such as dimethyl esters or anhydrides, and aliphatic, cycloaliphatic or araliphatic diols, and mixtures of these reaction products.

Preferred polyalkylene terephthalates comprise at least 80 mol %, preferably at least 90 mol %, based on the dicarboxylic acid component, of terephthalic acid radicals and at least 80 mol %, preferably at least 90 mol %, based on the diol component, of radicals of ethylene glycol and/or butane-1,4-diol.

The preferred polyalkylene terephthalates may comprise, in addition to terephthalic acid radicals, up to 20 mol %, preferably up to 10 mol %, of radicals of other aromatic or cycloaliphatic dicarboxylic acids having 8 to 14 C atoms or aliphatic dicarboxylic acids having 4 to 12 C atoms, such as radicals of phthalic acid, isophthalic acid, naphthalene-2,6-dicarboxylic acid, 4,4'-diphenyldicarboxylic acid, succinic acid, adipic acid, sebacic acid, azelaic acid and cyclohexanediacetic acid.

In addition to radicals of ethylene glycol or butane-1,4-diol, the preferred polyalkylene terephthalates may comprise up to 20 mol %, preferably up to 10 mol %, of other aliphatic diols having 3 to 12 C atoms or cycloaliphatic diols having 6 to 21 C atoms, e.g. radicals of propane-1,3-diol, 2-ethyl-propane-1,3-diol, neopentylglycol, pentane-1,5-diol, hexane-1,6-diol, cyclohexane-1,4-dimethanol, 3-ethylpentane-2,4-diol, 2-methylpentane-2,4-diol, 2,2,4-trimethylpentane-1,3-diol, 2-ethylhexane-1,3diol, 2,2-diethylpropane-1,3-diol, hexane-2,5-diol, 1,4-di-(β-hydroxyethoxy)-benzene, 2,2-bis-(4-hydroxycyclohexyl)-propane, 2,4-dihydroxy-1,1, 3,3-tetramethyl-cyclobutane, 2,2-bis-(4-β-hydroxyethoxyphenyl)-propane and 2,2-bis-(4-hydroxypropoxyphenyl)-propane (DE-A 2 407 674, 2 407 776 and 2 715 932).

The polyalkylene terephthalates may be branched by incorporation of relatively small amounts of 3- or 4-hydric alcohols or 3- or 4-basic carboxylic acids, e.g. in accordance with DE-A 1 900 270 and U.S. Pat. No. 3,692,744. Examples of preferred branching agents are trimesic acid, trimellitic acid, trimethylolethane and -propane and pentaerythritol.

Polyalkylene terephthalates which have been prepared solely from terephthalic acid and reactive derivatives thereof (e.g. dialkyl esters thereof) and ethylene glycol and/or butane-1,4-diol and mixtures of these polyalkylene terephthalates are particularly preferred.

Mixtures of polyalkylene terephthalates comprise 1 to 50 wt. %, preferably 1 to 30 wt. %, of polyethylene terephthalate and 50 to 99 wt. %, preferably 70 to 99 wt. %, of polybutylene terephthalate.

The polyalkylene terephthalates preferably used in general have a limiting viscosity of 0.4 to 1.5 dl/g, preferably 0.5 to 1.2 dl/g, measured in phenol/o-dichlorobenzene (1:1 parts by weight) at 25° C. in an Ubbelohde viscometer.

The polyalkylene terephthalates may be prepared by known methods (e.g. Kunststoff-Handbuch [Plastics Handbook], volume VIII, p. 695 et seq., Carl-Hanser-Verlag, Munich 1973).

A graft polymer of 5 to 95 wt. % of a vinylaromatic compound, as described under component B, on 95 to 5 wt. % of a graft base with a glass transition temperature of <10° C., preferably <0° C., particularly preferably <−20° C., may furthermore be employed as component D.

Component D may be contained in the composition according to the invention in an amount of preferably 0 to 50 wt. %, particularly preferably up to 40 wt. %, and in the most preferred manner up to 30 wt. %.

Component E

The compositions may optionally be given a flame-resistant treatment by addition of suitable additives. Examples of flameproofing agents which may be mentioned are halogen compounds, in particular based on chlorine and bromine, and compounds containing phosphorus.

The compositions preferably comprise phosphorus-containing flameproofing agents from the groups consisting of mono- and oligomeric phosphoric and phosphonic acid esters, phosphonate-amines and phosphazenes, it also being possible to employ mixtures of several components chosen from one or various of these groups as flameproofing agents. Other phosphorus compounds not mentioned specifically here may also be employed, by themselves or in any desired combination with other flameproofing agents.

Preferred mono- and oligomeric phosphoric or phosphonic acid esters are phosphorus compounds of the general formula (IV)

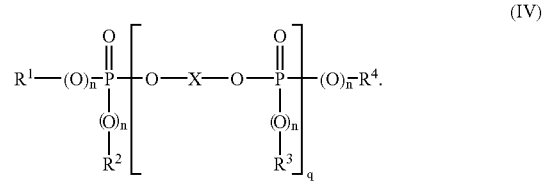

wherein $R^1$, $R^2$, $R^3$ and $R^4$ independently of one another each denote optionally halogenated $C_1$ to $C_8$-alkyl, or $C_5$ to $C_6$-cycloalkyl, $C_6$ to $C_{20}$-aryl or $C_7$ to $C_{12}$-aralkyl, in each case optionally substituted by alkyl, preferably $C_1$ to $C_4$-alkyl, and/or halogen, preferably chlorine or bromine, n independently of one another, denotes 0 or 1, q denotes 0 to 30 and X denotes a mono- or polynuclear aromatic radical having 6 to 30 C atoms or a linear or branched aliphatic radical having 2 to 30 C atoms, which may be OH-substituted and may contain up to 8 ether bonds.

Preferably, $R^1$, $R^2$, $R^3$ and $R^4$ independently of one another represent $C_1$ to $C_4$-alkyl, phenyl, naphthyl or phenyl-$C_1$–$C_4$-alkyl. The aromatic groups $R^1$, $R^2$, $R^3$ and $R^4$ may in their turn be substituted by halogen and/or alkyl groups, preferably chlorine, bromine and/or $C_1$ to $C_4$-alkyl. Particularly preferred aryl radicals are cresyl, phenyl, xylenyl, propylphenyl or butylphenyl and the corresponding brominated and chlorinated derivatives thereof.

X in formula (IV) preferably denotes a mono- or polynuclear aromatic radical having 6 to 30 C atoms. This is preferably derived from diphenols of the formula (I).

n in the formula (IV) may be, independently of one another, 0 or 1, and n is preferably 1.

q represents values from 0 to 30. If mixtures of various components of the formula (IV) are employed, mixtures preferably with number-average q values of 0.3 to 20, particularly preferably 0.5 to 10, in particular 0.5 to 6, may be used.

X particularly preferably represents

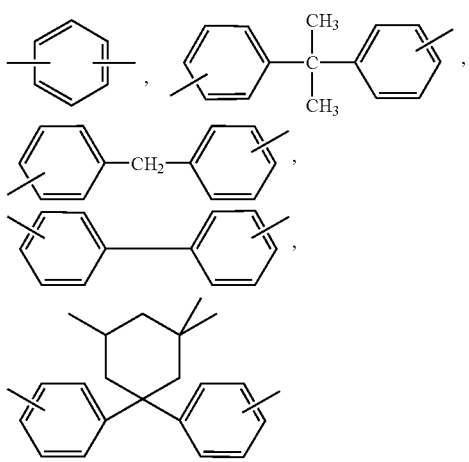

or chlorinated or brominated derivatives thereof, and in particular X is derived from resorcinol, hydroquinone, bisphenol A or diphenylphenol. X is particularly preferably derived from bisphenol A.

The use of oligomeric phosphoric acid esters of the formula (IV) which are derived from bisphenol A (cf. formula IVa) is particularly advantageous since the compositions treated with this phosphorus compound have a particularly high resistance to stress cracking and hydrolysis and a particularly low tendency towards the formation of deposits during processing by injection molding. Furthermore, a particularly high heat distortion point may be achieved with these flameproofing agents.

Further preferred phosphorus-containing compounds are compounds of the formula (IVa)

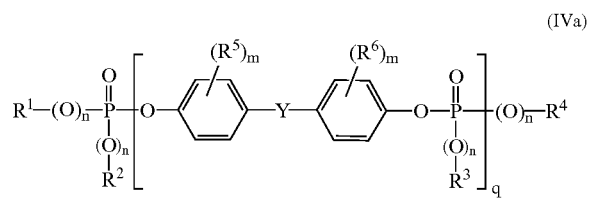

(IVa)

wherein $R^1$, $R^2$, $R^3$, $R^4$, n and q have the meaning given in the case of formula (IV), m independently of one another, denotes 0, 1, 2, 3 or 4, $R^5$ and $R^6$ independently of one another denote $C_1$ to $C_4$-alkyl, preferably methyl or ethyl, and Y denotes $C_1$ to $C_7$-alkylidene, $C_1$–$C_7$-alkylene, $C_5$ to $C_{12}$-cycloalkylene, $C_5$ to $C_{12}$-cycloalkylidene, —O—, —S—, —SO$_2$— or —CO—, preferably isopropylidene or methylene.

Monophosphates (q=0), oligophosphates (q=1–30) or mixtures of mono- and oligophosphates may be employed as component E according to the invention.

Monophosphorus compounds of the formula (IV) are, in particular, tributyl phosphate, tris-(2-chloroethyl) phosphate, tris-(2,3-dibromopropyl) phosphate, triphenyl phosphate, tricresyl phosphate, diphenyl cresyl phosphate, diphenyl octyl phosphate, diphenyl 2-ethylcresyl phosphate, tris-(isopropylphenyl) phosphate, halogen-substituted aryl phosphates, methylphosphonic acid dimethyl ester, methylphosphenic acid diphenyl ester, phenylphosphonic acid diethyl ester, triphenylphosphine oxide or tricresylphosphine oxide.

The phosphorus compounds according to component E are known (cf. e.g. EP-A 0 363 608 and EP-A 0 640 655) or may be prepared by known methods in an analogous manner (e.g. Ullmanns Enzyklopädie der technischen Chemie [Ullmann's Encyclopaedia of Industrial Chemistry], vol. 18, p. 301 et seq. 1979; Houben-Weyl, Methoden der organischen Chemie [Methods of Organic Chemistry], vol. 12/1, p. 43; Beilstein vol. 6, p. 177).

The average q values may be determined by determining the composition of the phosphate mixture (molecular weight distribution) by means of a suitable method (gas chromatography (GC), High Pressure Liquid Chromatography (HPLC) or gel permeation chromatography (GPC)) and calculating the mean values for q therefrom.

Phosphonate-amines are preferably compounds of the formula (V)

(V)

in which

A represents a radical of the formula (Va)

(Va)

or (Vb)

(Vb)

$R^{11}$ and $R^{12}$ independently of one another represent unsubstituted or substituted $C_1$ to $C_{10}$-alkyl or represent unsubstituted or substituted $C_6$ to $C_{10}$-aryl, $R^{13}$ and $R^{14}$ independently of one another represent unsubstituted or substituted $C_1$ to $C_{10}$-alkyl or unsubstituted or substituted $C_6$ to $C_{10}$-aryl or $R^{13}$ and $R^{14}$ together represent unsubstituted or substituted $C_3$ to $C_{10}$-alkylene, y denotes the numerical values 0, 1 or 2 and $B^1$ independently represents hydrogen, optionally halogenated $C_2$ to $C_8$-alkyl or unsubstituted or substituted $C_6$ to $C_{10}$-aryl.

$B^1$ preferably independently represents hydrogen, ethyl, n- or iso-propyl, which may be substituted by halogen, or $C_6$ to $C_{10}$-aryl, in particular phenyl or naphthyl, which is unsubstituted or substituted by $C_1$ to $C_4$-alkyl and/or halogen.

Alkyl in $R^{11}$, $R^{12}$, $R^{13}$ and $R^{14}$ independently preferably represents methyl, ethyl, n-propyl, iso-propyl, n-, iso-, sec- or tert-butyl, pentyl or hexyl.

Substituted alkyl in $R^{11}$, $R^{12}$, $R^{13}$ and $R^{14}$ independently preferably represents $C_1$ to $C_{10}$-alkyl substituted by halogen, in particular mono- or disubstituted methyl, ethyl, n-propyl, iso-propyl, n-, iso-, sec- or tert-butyl, pentyl or hexyl.

$C_6$ to $C_{10}$-aryl in $R^{11}$, $R^{12}$, $R^{13}$ and $R^{14}$ independently preferably represents phenyl, naphthyl or binaphthyl, in particular o-phenyl, o-naphthyl or o-binaphthyl, which may be substituted (in general mono-, di- or trisubstituted) by halogen.

$R^{13}$ and $R^{14}$, together with the oxygen atoms to which they are bonded directly and the phosphorus atom, may form a ring structure.

The following are mentioned by way of example and as preferred:

5,5,5',5',5'',5''-hexamethyltris(1,3,2-dioxaphosphorinane-methane)amino -2,2',2''-trioxide of the formula (Va–1)

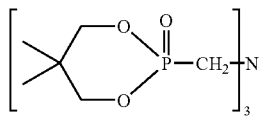

(test product XPM 1000 of Solutia Inc., St. Louis, USA), 1,3,2-dioxaphosphorinane-2-methanamine, N-butyl-N-(5,5-dimethyl-1,3,2-dioxaphosphorinane-2yl)methyl]-5,5-dimethyl-, P,2-dioxide; 1,3,2-dioxaphosphorinane-2-methanamine, N-[[5,5-dimethyl-1,3,2-dioxaphosphorinan2-yl)methyl]-5,5-dimethyl-N-phenyl-, P,2-dioxide; 1,3,2-dioxaphosphorinane-2-methanamine, N,N-dibutyl-5,5-dimethyl-, 2-oxide, 1,3,2-dioxaphosphorinane-2-methanimine, N-[(5,5-dimethyl-1,3,2-dioxaphosphorinan-2-yl)-methyl]-N-ethyl-5,5dichloromethyl-,P,2-dioxide, 1,3, 2-dioxaphosphorinane-2-methanamine, N-butyl-N-[(5,5-dichloromethyl-1,3,2-dioxaphoshporinan-2-yl)-methyl]-5, 5-dichloromethyl-, P,2-dioxide, 1,3,2-dioxaphosphorinane-2-methanamine, N-[(5,5-dichloromethyl-1,3,2-dioxaphosphorinan-2-yl)methyl]-5,5-dichloromethyl-N-phenyl-, P,2-dioxide; 1,3,2-dioxaphosphorinane-2-methanamine, N,N-di-(4-chlorobutyl)-5,5-dimethyl-2oxide; 1,3,2-dioxaphosphorinane-2-methanimine, N-[(5,5-dimethyl-1,3,2-dioxaphosphorinan-2-yl)methane]-N-(2-chloroethyl)-5,5-di(chloromethyl)-, P,2-dioxide.

Compounds which are furthermore preferred are:
Compounds of the formula (Va-2) or (Va-3)

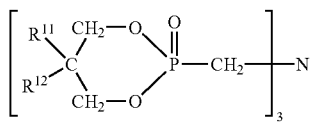

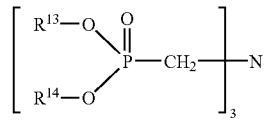

wherein $R^{11}$, $R^{12}$, $R^{13}$ and $R^{14}$ have the abovementioned meaning.

Compounds of the formula (Va-2) and (Va-1) are particularly preferred.

The preparation of the phosphonate-amines is described, for example, in U.S. Pat. No. 5,844,028.

Phosphazenes are compounds of the formulae (Via) and (VIb)

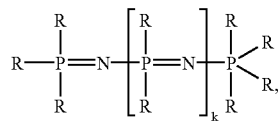

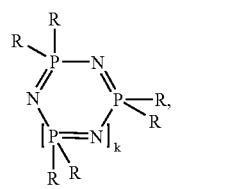

wherein

R is in each case identical or different and represents amino, in each case optionally halogenated, preferably halogenated with fluorine, $C_1$ to $C_8$-alkyl, or $C_1$ to $C_8$-alkoxy, or $C_5$ to $C_6$-cycloalkyl, $C_6$ to $C_{20}$-aryl, preferably phenyl or naphthyl, $C_6$ to $C_{20}$-aryloxy, preferably phenoxy or naphthyloxy, or C7 to $C_{12}$-aralkyl, preferably phenyl-$C_1$–$C_4$-alkyl, in each case optionally substituted by alkyl, preferably $C_1$ to $C_4$-alkyl, and/or halogen, preferably chlorine and/or bromine, k represents 0 or a number from 1 to 15, preferably a number from 1 to 10.

Examples which may be mentioned are propoxyphosphazene, phenoxyphosphazene, methylphenoxyphosphazene, aminophosphazene and fluoroalkylphosphazenes. Phenoxyphosphazene is particularly preferred.

The phosphazenes may be employed by themselves or as a mixture. The radical R may always be identical, or 2 or more radicals in the formulae (Ia) and (Ib) may differ.

Phosphazenes and their preparation are described, for example, in EP-A 0 728 811, DE-A 1 961 668 and WO 97/40092.

The flameproofing agents may be employed by themselves or in any desired mixture with one another or in a mixture with other flameproofing agents.

Component E may be contained in the composition according to the invention in an amount of preferably 1 to 40 wt. %, particularly preferably 2 to 30 wt. %, and in the most preferred manner 2 to 20 wt. %, based on the weight of the composition.

Component F

The flameproofing agents corresponding to component E are often used in combination with so-called anti-dripping agents which reduce the tendency of the material to form burning drips in the event of a fire. Examples which may be mentioned here are compounds of the substance classes of fluorinated polyolefins, silicones and aramid fibres. These may also be employed in the compositions according to the invention. Fluorinated polyolefins are preferably employed as anti-dripping agents.

Fluorinated polyolefins are known and are described, for example, in EP-A 0 640 655. They are marketed, for example, under the brand name Teflon® 30N by DuPont.

The fluorinated polyolefins may be employed both in the pure form and in the form of a coagulated mixture of emulsions of the fluorinated polyolefins with emulsions of the graft polymers (component B) or with an emulsion of a copolymer, preferably based on styrene/acrylonitrile, the fluorinated polyolefin being mixed as an emulsion with an emulsion of the graft polymer or of the copolymer and the mixture then being coagulated.

The fluorinated polyolefins may furthermore be employed as a precompound with the graft polymer (component B) or a copolymer, preferably based on styrene/acrylonitrile. The fluorinated polyolefins are mixed as powders with a powder or granules of the graft polymer or copolymer and the mixture is compounded in the melt in general at temperatures of 200 to 330° C. in conventional units, such as internal kneaders, extruders or twin-screw extruders.

The fluorinated polyolefins may also be employed in the form of a masterbatch, which is prepared by emulsion polymerization of at least one monoethylenically unsaturated monomer in the presence of an aqueous dispersion of the fluorinated polyolefin. Preferred monomer components are styrene, acrylonitrile and mixtures thereof. The polymer is employed as a free-flowing powder, after acidic precipitation and subsequent drying.

The coagulates, precompounds or masterbatches conventionally have solids contents of fluorinated polyolefin of 5 to 95 wt. %, preferably 7 to 60 wt. %.

Component F may be contained in the composition according to the invention in an amount of preferably 0.05 to 10 wt. %, particularly preferably 0.1 to 5 wt. % and in the most preferred manner 0.1 to 4 wt. %, based on the weight of the composition.

Component G (Further Additives)

The compositions according to the invention may furthermore comprise at least one of the conventional additives, such as lubricants and mold release agents, for example pentaerythritol tetrastearate, nucleating agents, antistatics, stabilizers and further fillers and reinforcing substances, as well as dyestuffs and pigments.

The compositions according to the invention may comprise up to 35 wt. %, based on the total composition, of a further flameproofing agent, which optionally has a synergistic action. Examples of further flameproofing agents which are mentioned are silicones, organic halogen compounds, such as decabromobisphenyl ether and tetrabromobisphenol, inorganic halogen compounds, such as ammonium bromide, nitrogen compounds, such as melamine and melamine-formaldehyde resins, inorganic hydroxide compounds, such as Mg and Al hydroxide, inorganic compounds, such as antimony oxides, barium metaborate, hydroxoantimonate, zirconium oxide, zirconium hydroxide, molybdenum oxide, ammonium molybdate, zinc borate, ammonium borate, barium metaborate, talc, silicate, silicon oxide and tin oxide, and siloxane compounds.

The sum of the wt. % of all the components is 100.

The compositions according to the invention are prepared by mixing the particular constituents in a known manner and subjecting the mixture to melt compounding and melt extrusion at temperatures of 200° C. to 300° C. in conventional units, such as internal kneaders, extruders and twin-screw extruders.

The mixing of the individual constituents may take place in a known manner both successively and simultaneously, and in particular both at about 20° C. (room temperature) and at a higher temperature.

The compositions according to the invention may be used for the production of all types of shaped articles. These may be produced, for example, by injection molding extrusion and blow molding processes. Another form of processing is the production of shaped articles by thermoforming from previously produced sheets or films.

Examples of such shaped articles are films, profiles, housing components of all types, e.g. for domestic appliances, such as juice presses, coffee machines and mixers; for office machines, such as monitors, printers and copiers; and furthermore sheets, pipes, electrical installation conduits, profiles for the building sector, interior fitting-out and exterior uses; components from the field of electrical engineering, such as switches and plugs, as well as internal and external components for cars.

In particular, the compositions according to the invention may be used, for example, for the production of the following shaped articles or moldings:

Interior fittings for railway vehicles, ships, aeroplanes, buses and cars, hub caps, housings for electrical appliances containing small transformers, housings for equipment for information processing and transmission, housings and linings for medical purposes; massage apparatuses and housings therefor, toy vehicles for children, flat wall elements, housings for safety equipment, rear spoilers, vehicle body components for lorries, thermally insulated transportation containers, devices for housing or care of small animals, moldings for sanitary and bath equipment, cover grids for fan openings, moldings for summerhouses and tool sheds, housings for garden equipment.

The following examples serve to further illustrate the invention.

EXAMPLES

The components stated in table 1 and explained briefly below are compounded on a ZSK-25 at 240° C. (V1 and 1) or 260° C. (V2, V3 and 2). The shaped articles are produced on an injection molding machine type Arburg 270 E at 240°/260° C.

Component A1

Linear polycarbonate based on bisphenol A with a relative solution viscosity of 1.24, measured in $CH_2Cl_2$ as the solvent at 25° C. and a concentration of 0.5 g/100 ml.

Component A2

Linear polycarbonate based on bisphenol A with a relative solution viscosity of 1.28, measured in $CH_2Cl_2$ as the solvent at 25° C. and a concentration of 0.5 g/100 ml.

Component B

Graft polymer of 40 parts by wt. of a copolymer of styrene and acrylonitrile in a ratio of 73:27 on 60 parts by wt. of particulate crosslinked polybutadiene rubber (median particle diameter $d_{50}=0.3$ μm), prepared by emulsion polymerization.

Component C1

Naintsch A3 (Naintsch Mineralwerke GmbH, Graz, Austria) talc with an median particle diameter ($d_{50}$) according to the manufacturer of 1.2 μm.

Component C2

HiTalc Premium HTP ultra 5 (IMI Fabi S.p.A., Italy) compacted talc with a median particle diameter ($d_{50}$) according to the manufacturer of 0.5 µm.

Component C3

HiTalc Premium HTP ultra 10 (IMI Fabi S.p.A., Italy) talc with a median particle diameter ($d_{50}$) according to the manufacturer of 1.1 µm.

All the components C1 to C3 are ground, naturally occurring minerals with a talc content of $\geqq 98$ wt. %. According to the manufacturer, the $Al_2O_3$ content of all types is $\leqq 1$ wt. %, and the $Fe_2O_3$ content of all the materials, determined by means of X-ray fluorescence spectroscopy, is $\leqq 0.5$ wt. %.

Component D

Styrene/acrylonitrile copolymer with a styrene/acrylonitrile weight ratio of 72:28 and a limiting viscosity of 0.55 dl/g (measurement in dimethylformamide at 20° C.).

Component E

Oligophosphate based on bisphenol A

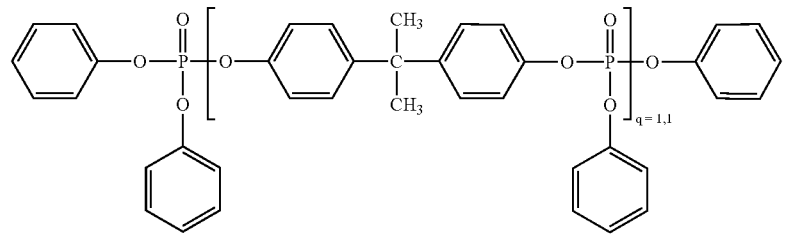

Component F

Tetrafluoroethylene polymer as a coagulated mixture from an ABS graft polymer emulsion according to the abovementioned component B in water and a tetrafluoroethylene polymer emulsion in water. The weight ratio of graft polymer B to tetrafluoroethylene polymer in the mixture is 90 wt. % to 10 wt. %. The tetrafluoroethylene polymer emulsion has a solids content of 60 wt. %; the average PTFE particle diameter is between 0.05 and 0.5 µm. The ABS graft polymer emulsion has a solids content of 34wt. %.

The emulsion of the tetrafluoroethylene polymer (Teflon® 30 N from DuPont) is mixed with the emulsion of the ABS graft polymer B and the mixture is stabilized with 1.8 wt. %, based on the polymer solid, of phenolic antioxidants. The mixture is coagulated with an aqueous solution of $MgSO_4$ (Epsom salts) and acetic acid at 85 to 95° C. at pH 4 to 5 and filtered and the product is washed until practically free from electrolytes and then freed from the majority of the water by centrifugation and subsequently dried at 100° C. to give a powder.

Component G1

Pentaerythritol tetrastearate (PETS) as a mold release agent.

Component G2

Phosphite stabilizer

Investigation of the Properties of the Molding Compositions According to the Invention The notched impact strength $a_k$ and the impact strength $a_n$ are determined in accordance with ISO 180/1 A or ISO 180/1 U. To determine the temperature of the tough/brittle transition, the notched impact strengths $a_k$ are measured at various temperatures and evaluated. For this, starting from room temperature the test temperature is lowered in steps of 5° until a brittle fracture is observed.

To determine the weld line strength, the impact strength at the weld seam of test specimens injection-molded from both sides (processing temperature: 240/260° C.) of dimensions 170×10×4 mm is measured in accordance with ISO 179/1 eU.

The E modulus and the elongation at break were determined in the tensile test according to ISO 527.

The burning properties of the flame-resistant specimens were measured in accordance with UL-Subj. 94 V on bars of dimensions 127×12.7×1.2 mm, which were produced on an injection molding machine at 260° C.

Examples 1 and 2 and Comparison Examples V1 to V3

TABLE 2

Composition and properties

| Examples/components | | V1 | 1 | V2 | V3 | 2 |
|---|---|---|---|---|---|---|
| A1 | polycarbonate | 63.2 | 63.2 | | | |
| A2 | polycarbonate | | | 55.11 | 55.11 | 55.11 |
| B | graft polymer | 4.9 | 4.9 | 14.7 | 14.7 | 14.7 |
| C1 | talc | 9.8 | | 7.35 | | |
| C2 | talc | | 9.8 | | | 7.35 |
| C3 | talc | | | | 7.35 | |
| D | styrene/acrylonitrile copolymer | 4.9 | 4.9 | 22.04 | 22.04 | 22.04 |
| E | oligophosphate | 12.8 | 12.8 | | | |
| F | Teflon masterbatch | 3.9 | 3.9 | | | |
| G1 | mold release agent | 0.4 | 0.4 | 0.69 | 0.69 | 0.69 |
| G2 | stabilizer | 0.1 | 0.1 | 0.11 | 0.11 | 0.11 |
| Properties: | | | | | | |
| $a_k$ (RT) | [kJ/m²] | — | — | 42.59 | 50.63 | 55.14 |
| Tough/brittle transition | [° C.] | — | — | 5 | −5 | −10 |
| $a_n$ (RT) | [kJ/m²] | 123 | 164 | — | — | — |
| $a_n$ weld line strength (RT) | [kJ/m²] | 3 | 5 | 4 | 5 | 5 |
| E modulus (RT) | [GPa] | 3.9 | 3.9 | 3.1 | 3.1 | 3.1 |

TABLE 2-continued

| Examples/components | V1 | 1 | V2 | V3 | 2 |
|---|---|---|---|---|---|
| Composition and properties | | | | | |
| Elongation at break [%] (RT) | 12.0 | 13.4 | 58.1 | 93.3 | 99.2 |
| UL 94 V @ 1.2 mm | V-0 | V-0 | — | — | — |

These results show that the compositions 1 and 2 according to the invention have a significantly improved toughness, elongation at break and weld line strength compared with the comparison compositions V1 to V3.

Surprisingly, the melt flow was found independent of the particle size of the talc.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A thermoplastic molding composition consisting of:
(A) at least one member selected from the group consisting of aromatic polycarbonate and polyester-carbonate;
(B) at least one graft polymer of,
   (B.1) 5 to 95% relative to the weight of the graft polymer of a graft shell that includes the polymerized mixture of,
      (B.1.1) 50 to 99 parts by weight of at least one member selected from the group consisting of vinylaromatic monomer, nucleus-substituted vinylaromatic monomer and ($C_1$–$C_8$)-alkyl ester of methacrylic acid, and
      (B.1.2) 1 to 50 parts by weight of at least one member selected from the group consisting of vinyl cyanide, ($C_1$–$C_8$)-alkyl ester of (meth)acrylic acid, anhydrides of unsaturated carboxylic acids and imides of unsaturated carboxylic acids, the total of the parts by weights being 100, and
   (B.2) 95 to 5% relative to the weight of the graft polymer of a graft base that contains a rubber having a glass transition temperature of below about 10° C., said graft base having a median particle size of 0.2 to 1 µm;
(C) talc having median particle diameter of less than 600 nm;
(D) at least one member selected from the group consisting of rubber-free vinyl (co)polymer and polyalkylene terephthalate;
(E) a phosphorous-containing compound represented by the following formula

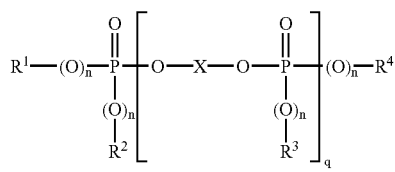

wherein
$R^1$, $R^2$, $R^3$ and $R^4$, independently of each other, denote a member selected from the group consisting of $C_1$ to $C_8$-alkyl,
$C_5$ to $C_6$-cycloalkyl, $C_6$ to $C_{20}$-aryl and $C_7$ to $C_{12}$-aralkyl,
each n independently of each other, denotes 0 or 1,
q denotes 0 to 30, and
X denotes a mono- or polynuclear aromatic radical having 6 to 30 carbon atoms or a linear or branched aliphatic radical having 2 to 30 carbon atoms;
(F) optionally an anti-dripping agent selected from the group consisting of fluorinated polyolefins and aramids; and
(G) optionally at least one member selected from the group consisting of nucleating agents, antistatics, stabilizers, fillers, reinforcing substances, dyestuffs, pigments, pentaerythritol tetrastearate and further flame proofing agents,
said further flame proofing agents being selected from the group consisting of decabromobisphenyl ether, tetrabromobisphenol, ammonium bromide, melamine, melamine-formaldehyde resins, Mg hydroxide, Al hydroxide, antimony oxides, barium metaborate, hydroxoantimonate, zirconium oxide, zirconium hydroxide, molybdenum oxide, ammonium molybdate, zinc borate, ammonium borate, barium metaborate, silicate, silicon oxide, tin oxide and combinations thereof.

2. The composition according to claim 1 wherein component A is present in an amount of 20 to 90% relative to the weight of the composition.

3. The composition according to claim 1 wherein the graft shell is a copolymer of styrene and acrylonitrile.

4. The composition according to claim 1 wherein the rubber is at least one member selected from the group consisting of diene, ethylene-propylene-diene terpolymer, acrylate, polyurethane, silicone, chloroprene and ethylene/vinyl acetate.

5. The composition according to claim 1 wherein the graft polymer is at least one member selected from the group consisting of emulsion-polymerize acrylonitrile-butadiene-styrene graft polymer and bulk-polymerized acrylonitrile-butadiene-styrene graft polymer.

6. The composition according to claim 1 wherein the graft polymer is present in an amount of 1 to 50% relative to the weight of the composition.

7. The composition according to claim 1 wherein the graft polymer is present in an amount of 2 to 30% relative to the weight of the composition.

8. The composition according to claim 1 wherein the talc is present in an amount of 0.1 to 30% relative to the weight of the composition.

9. The composition according to claim 1 wherein the talc is present in an amount of 1 to 15% relative to the weight of the composition.

10. The composition according to claim 1 wherein component D is present in a positive amount up to 50% relative to the weight of the composition.

11. The composition according to claim 1 wherein the phosphorus-containing compound (E) is represented by the following formula,

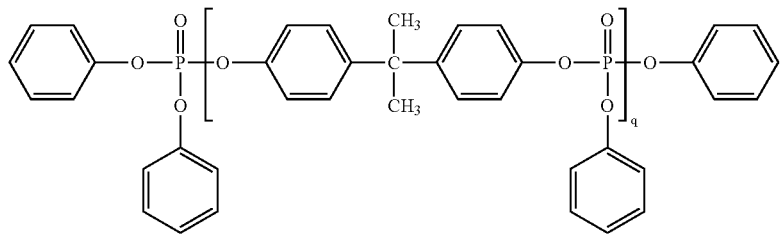

wherein q=0.5 to 30.

12. The composition according to claim 1 wherein component E is present in an amount of 1 to 40% based on the weight of the composition.

13. The composition according to claim 1 wherein component B is present in an amount of 2 to 10% based on the weight of the composition.

14. A method of using the composition of claim 1 comprising molding articles.

15. A molded article comprising the composition of claim 1.

16. A thermoplastic molding composition consisting of:
(A) from 20 to 90% relative to the weight of the composition of at least one member selected from the group consisting of aromatic polycarbonate and polyestercarbonate;
(B) from 1 to 50% relative to the weight of the composition of at least one graft polymer of,
  (B.1) 5 to 95% relative to the weight of the graft polymer of a graft shell that includes the polymerized mixture of,
    (B.1.1) 50 to 99 parts by weight of at least one member selected from the group consisting of vinylaromatic monomer, nucleus-substituted vinylaromatic monomer and ($C_1$–$C_8$)-alkyl ester of methacrylic acid, and
    (B.1.2) 1 to 50 parts by weight of at least one member selected from the group consisting of vinyl cyanide, ($C_1$–$C_8$)-alkyl ester of (meth)acrylic acid, anhydrides of unsaturated carboxylic acids and imides of unsaturated carboxylic acids, the total of the parts by weights being 100, and
  (B.2) 95 to 5% relative to the weight of the graft polymer of a graft base that contains a rubber having a glass transition temperature of below about 10° C., said graft base having a median particle size of 0.2 to 1 μm;
(C) from 0.1 to 30% relative to the weight of the composition of talc having median particle diameter of less than 600 nm;
(D) from 0 to 50% relative to the weight of the composition of least one member selected from the group consisting of rubber-free vinyl (co)polymer and polyalkylene terephthalate;
(E) from 1 to 40% based on the weight of the composition of a phosphorous-containing compound represented by the following formula

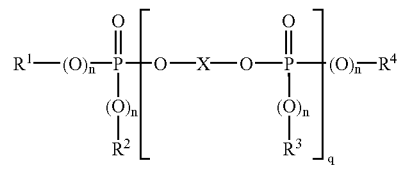

wherein
$R^1$, $R^2$, $R^3$ and $R^4$, independently of each other, denote a member selected from the group consisting of $C_1$ to $C_8$-alkyl,
$C_5$ to $C_6$-cycloalkyl, $C_6$ to $C_{20}$-aryl and $C_7$ to $C_{12}$-aralkyl,
each n independently of each other, denotes 0 or 1;
q denotes 0 to 30; and
X denotes a mono- or polynuclear aromatic radical having 6 to 30 carbon atoms or a linear or branched aliphatic radical having 2 to 30 carbon atoms;
(F) optionally from 0.05 to 10% based on the weight of the composition of an anti-dripping agent selected from the group consisting of fluorinated polyolefins and aramids; and
(G) optionally up to about 35% based on the weight of the composition of at least one member selected from the group consisting of nucleating agents, antistatics, stabilizers, fillers, reinforcing substances, dyestuffs, pigments, pentaerythritol tetrastearate and further flame proofing agents, said further flame proofing agents being selected from the group consisting of decabromobisphenyl ether, tetrabromobisphenol, ammonium bromide, melamine, melamine-formaldehyde resins, Mg hydroxide, Al hydroxide, antimony oxides, barium metaborate, hydroxoantimonate, zirconium oxide, zirconium hydroxide, molybdenum oxide, ammonium molybdate, zinc borate, ammonium borate, barium metaborate, silicate, silicon oxide, tin oxide and combinations thereof.

* * * * *